Patented Feb. 15, 1944

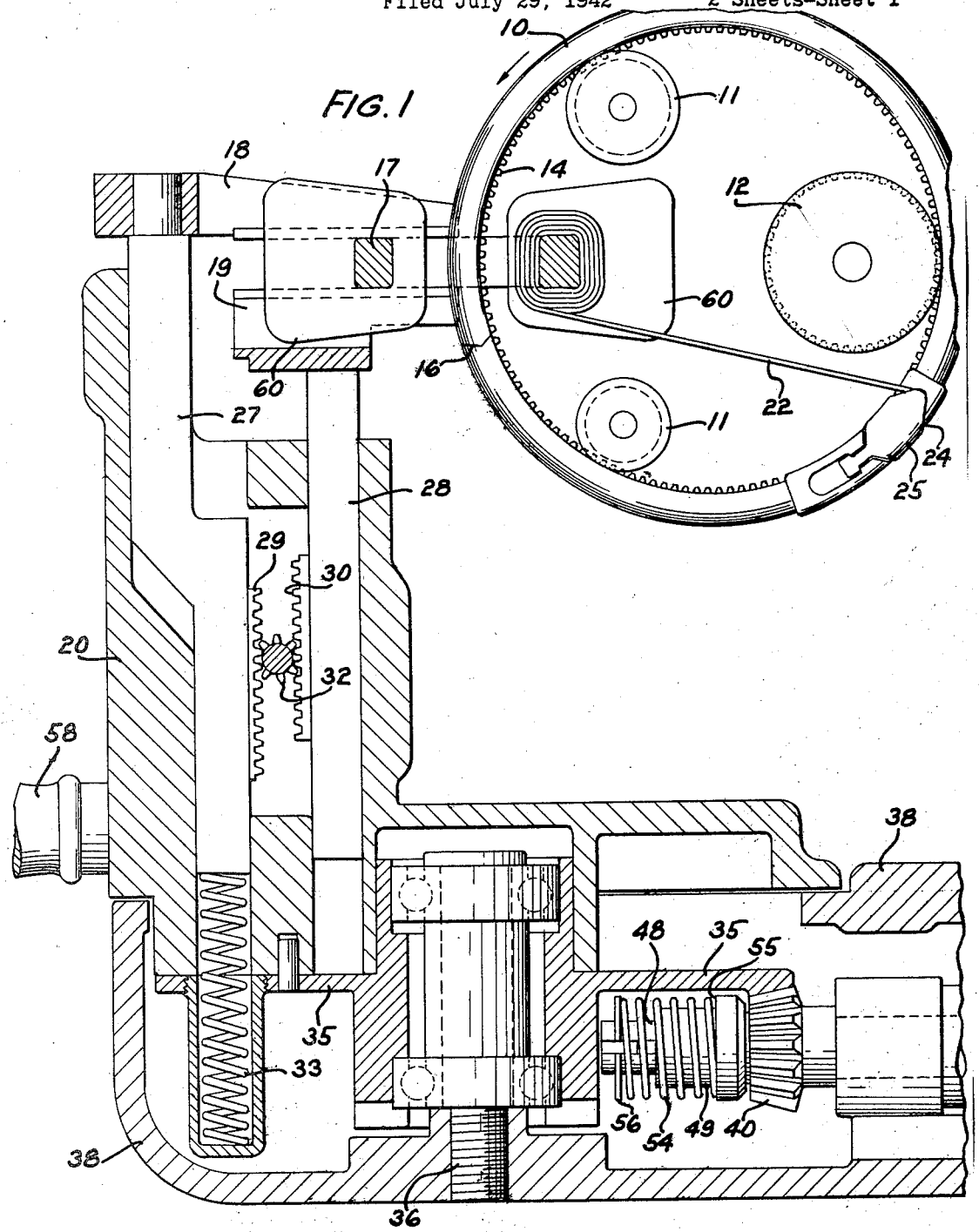

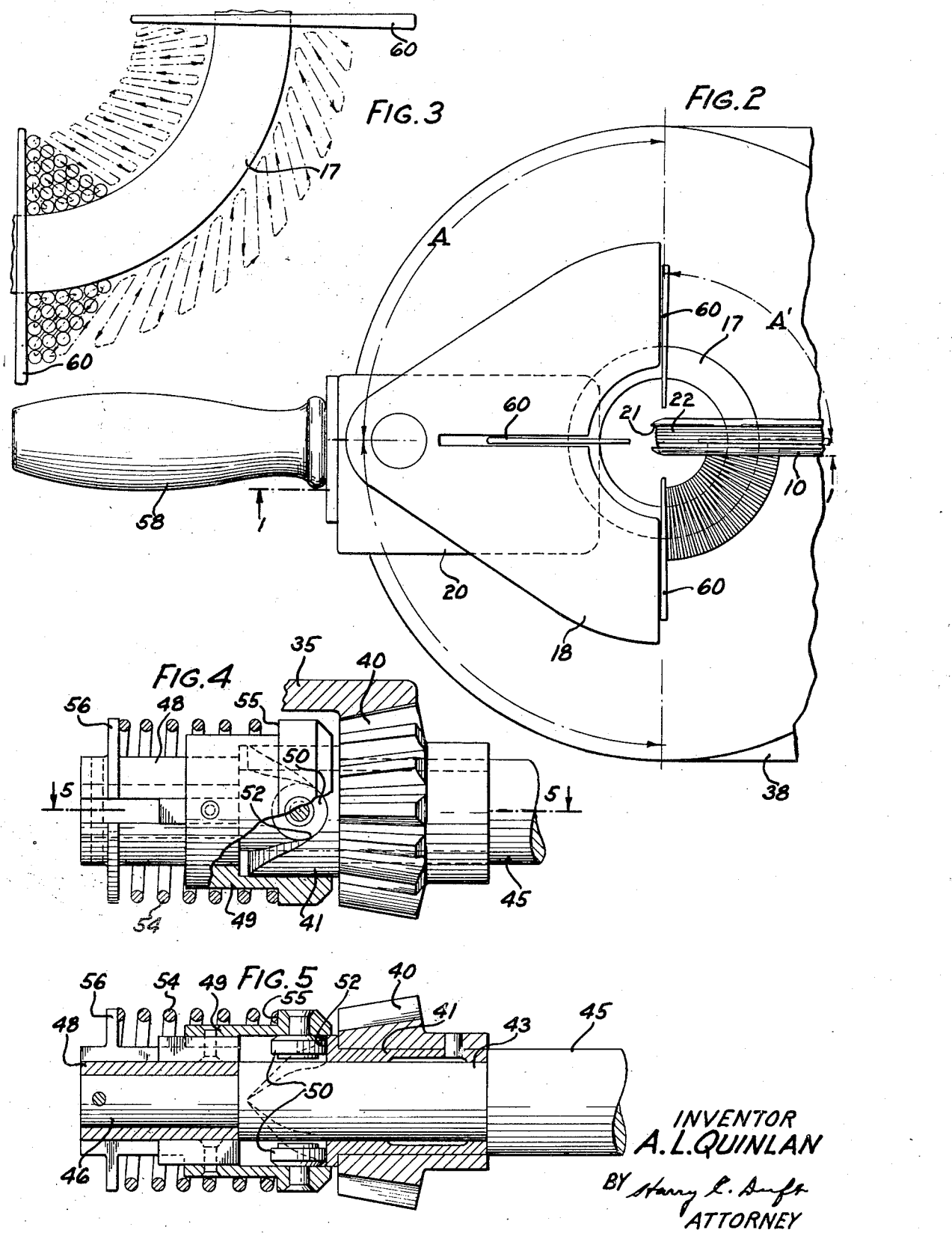

2,341,650

UNITED STATES PATENT OFFICE 2,341,650

TOROIDAL COIL WINDING MACHINE

Amos L. Quinlan, La Grange Park, Ill., assignor to Western Electric Company, Incorporated, New York, N. Y., a corporation of New York Application July 29, 1942, Serial No. 452,731

9 Claims. (Cl. 242—4)

This invention relates to winding machines, and more particularly to machines for winding toroidal coils of the bank-wound type.

Objects of the invention are to provide a simple, inexpensive and efficient machine for winding bank-wound coils.

In accordance with one embodiment of the invention, there is provided a toroidal coil winding machine in which the usual oscillatory core holding clamp is driven through a yieldable clutch which permits a limited amount of backward and forward movement of the clamp independently of the power driving means in order to apply the wire to the core in successive layers disposed obliquely with respect to the axis of the core.

Other features of the invention will become apparent from the following detailed description when read in conjunction with the accompanying drawings, in which Fig. 1 is a fragmentary vertical sectional view of a toroidal coil winding machine embodying the features of the invention, the section being taken on line 1—1 of Fig. 2;

Fig. 2 is a fragmentary plan view of the machine;

Fig. 3 is an enlarged diagrammatic view of a section of a bank-wound coil of the type which the machine is capable of producing;

Fig. 4 is an enlarged elevational view of the yieldable clutch for driving the core holding clamp, and Fig. 5 is a longitudinal sectional view on line 5—5 of Fig. 4.

The toroidal coil winding machine illustrated in the drawings comprises a winding ring 10, which is rotatably supported upon a plurality of grooved guide rollers 11, 11 around which it is driven by a driving gear 12. The inner surface of the winding ring is formed with gear teeth 14, 14 for engagement with the driving gear. A separable transverse joint 16 is provided in the winding ring for the insertion of a closed ring shaped core 17, upon which the wire is to be wound to form the coil. After being interlinked with the winding ring, the core is clamped between cooperating upper and lower clamping jaws 18 and 19, respectively, of an oscillatory core holding clamp 20.

The winding ring is provided on its outer surface with a circumferential wire storage groove 21 (Fig. 2) that is capable of accommodating a predetermined amount of wire 22 which is wound on the winding ring after the latter has been interlinked with the core. Before starting the winding of the coil, the outer end of the wire on the winding ring is attached to the core after being threaded through a wire guiding slot 24 of a slider 25 which is slidably mounted on one side of the winding ring. The winding ring is then rotated in the direction indicated by the arrow in Fig. 1, whereby the wire is withdrawn from the winding ring and applied to the core.

The clamping jaws 18 and 19 of the core holding clamp 20 are attached to the upper ends of vertically reciprocable bars 27 and 28 which have rack bars 29 and 30, respectively, attached to their opposed vertical surfaces and in driving engagement with opposite sides of a gear 32. Thus, through the rotation of the gear, the bars 27 and 28 may be shifted in opposite directions to open or close the clamping jaws. Bar 27 is pressed upwardly by a coil spring 33 which yieldably holds the clamping jaws in their open positions. A suitable latch mechanism may be provided for holding the clamping jaws in their clamping positions.

In the illustrated embodiment of the invention, the core holding clamp 20 is attached to a mutilated or toothless portion of a large bevel gear 35 so that it is rotatable therewith about a vertical stub shaft 36 projecting upwardly from the bottom of a gear housing 38. Meshing with bevel gear 35 is a bevel pinion 40 which is keyed to a driven clutch sleeve 41 (Fig. 5). The driven clutch sleeve is loosely mounted on a reduced portion 43 of a horizontal driving shaft 45. To a reduced end portion 46 of this shaft there is secured a bushing 48 upon which a driving clutch sleeve 49 is slidably keyed. The driving clutch sleeve carries two diametrically opposed rollers 50—50 and the opposed end surface of the driven clutch sleeve 41 is formed with two diametrically opposed V-shaped depressions on grooves 52—52 for driving engagement with the rollers. The rollers are yieldably held in the bottom of the V-shaped grooves by a coil spring 54 interposed between an annular shoulder 55 on the driving clutch sleeve and an annular flange 56 on bushing 48.

It will be noted that the side walls of the V-shaped grooves 52 are inclined, so that the clutch rollers 50 are capable of rolling therealong toward the flange 56 to permit angular movement of the driven clutch sleeve relative to the driving clutch sleeve. During such relative angular movement of the driven clutch sleeve, the driving clutch sleeve is shifted axially away from the driven clutch sleeve against the opposing force of the spring 54. Thus, by limiting the extent of axial movement of the driving clutch sleeve, the extent of the relative angular movement of the driven clutch sleeve is correspondingly limited. In the illustrated embodiment of the invention, axial outward movement of the driving clutch sleeve is limited by the flange 56 on the bushing 48, and it will be noted that this flange prevents sufficient axial outward movement of the driving clutch sleeve to permit the clutch rollers 50 to roll completely out of their respective grooves 52. Thus, a yieldable clutch or driving connection is provided through which the core holding clamp is driven from the driving shaft 45, and this yieldable driving connection permits a limited amount of backward and forward movement of the core holding clamp independently of the driving shaft. A handle 58 is provided on the core holding clamp for convenience in manually oscillating it back and forth as it is rotated by the shaft.

The operation of the machine will be obvious from the above description. The core is interlinked with the winding ring and then inserted between the jaws of the clamp in the usual manner. The core illustrated in the drawings is divided into 4 equal sections by separating washers 60, 60, and each section is wound separately. The winding of each core section is started by positioning the core holding clamp so that one end of the core section is aligned with the winding ring, as shown in Fig. 2. The winding operation is then started by connecting the winding ring driving gear 12 and the shaft 45 to the power source (not shown). The shaft rotates the core holding clamp which, in turn, rotates the core through 90° to distribute the wire thereon as it is withdrawn from the rotating winding ring. By means of the handle 58, the core holding clamp is manually oscillated back and forth within the range permitted by the yieldable clutch described above, whereby a relatively small amount of backward and forward movement is imparted to the core manually as the core is rotated through 90° by the power means, so that the winding material is applied to the core in successive layers disposed obliquely with respect to the axis of the core, as shown in Fig. 3. This method of winding produces a coil of low distributed capacity, which is sometimes desirable, if not essential, particularly in high frequency circuits.

Any suitable means may be provided for stopping the winding operation of each section of the coil upon the completion of the winding of the required number of turns, and it will be understood that the relative speeds of rotation of winding ring 10 and driving shaft 45 are such that the required number of turns will be applied to each 90° section of the core during a 90° angular movement of the core by the driving shaft. Upon the completion of the winding of each section of the coil, the driven clutch sleeve 41 always returns to the same initial angular position with respect to the driving clutch sleeve under the force of spring 54 pressing clutch rollers 50 toward the bottom of the V-shaped grooves 52. Thus, the spring pressed roller and groove connection between the driving and driven clutch sleeves not only permits a limited amount of backward and forward movement of the core holding clamp by the operator, but also controls the forward progress of the winding operation so that the winding will end at the end of the section when the required number of turns have been applied.

After the completion of the winding of the first half of the core during rotation of the clamp through 180°, the unwound half of the core is removed from the clamp and the wound half of the core is inserted and clamped between the clamp jaws 18 and 19, after which the clamp is returned to its original or starting position preparatory to the winding of the remaining half of the core which is accomplished in the same manner as the first half described above.

It is to be understood that the novel features of the invention are not limited to the specific embodiments thereof herein illustrated and described, but are capable of other applications within the scope of the appended claims.

What is claimed is:

1. A winding machine comprising a movable core supporting means, winding means for winding strand material on a core supported by said supporting means, means for moving said core supporting means in one direction relative to said winding means to distribute the strand material evenly on said core, and means for simultaneously imparting an oscillatory movement to said core supporting means to apply the strand material to the core in successive layers disposed obliquely with respect to the axis of the core.

2. In a machine for winding strand material on a core, a movable core supporting member, driving means for moving said member, a yieldable connection between said driving means and said core supporting member, and means for oscillating said core supporting member independently of said drawing means.

3. In a machine for winding strand material on a core, a movable core supporting member, driving means for moving said member, a yieldable connection between said driving means and said member whereby said member is oscillatable relative to said driving means, means for oscillating said core supporting member independently of said driving means, and means for limiting the amplitude of said oscillatory movement.

4. In a machine for winding strand material on a toroidal core, an oscillatory core holding member, driving means for rotating said core holding member in one direction to distribute the strand material on the core, and a yieldable clutch connecting said core holding member with said driving means, whereby said core holding member may be oscillated independently of said driving means.

5. In a machine for winding strand material on a toroidal core, the combination with a winding ring adapted to be interlinked with the core, of an oscillatory clamp for holding the core, driving means for rotating the core holding clamp in one direction to distribute the strand material on the core, a yieldable clutch connecting said core holding clamp with said driving means whereby said clamp may be given an oscillatory movement independently of said driving means, and means for limiting the extent of said oscillatory movement.

6. In a machine for winding strand material on a toroidal core, an oscillatory core holding clamp, driving means for rotating said clamp in one direction, and a yieldable clutch connecting said clamp with said driving means, said clutch comprising a driving member, a roller on said driving member, and a driven member having a groove for receiving said roller.

7. In a machine for winding strand material on a toroidal core, an oscillatory core holding clamp, driving means for rotating said clamp, a yieldable connection between said clamp and said driving means adapted to permit a limited amount of oscillatory movement of said clamp independently of said driving means, and a handle on said clamp for manually oscillating said clamp independently of said driving means.

8. A machine for winding strand material on a closed core, comprising a winding ring adapted to be interlinked with the core, means for rotating the winding ring to wind the strand material on the core, a rotary clamp for holding the core, means for rotating the clamp in one direction to distribute the strand material on the core, and means for superposing an oscillatory movement on said rotary movement to apply the strand material on the core in layers oblique to the axis of the core.

9. In a machine for winding strand material on a toroidal core, an oscillatory core holding clamp, driving means for said clamp, and a yieldable clutch connecting said clamp with said driving means, said clutch comprising a driving member, a roller on said driving member, a driven member having a V-shaped groove for receiving said roller to operatively interconnect said clutch members, and means for yieldably holding said roller in said groove.

AMOS L. QUINLAN.